(12) United States Patent
Mansuetto

(10) Patent No.: US 6,524,750 B1
(45) Date of Patent: Feb. 25, 2003

(54) DOPED TITANIUM OXIDE ADDITIVES

(75) Inventor: Michael F. Mansuetto, Bay Village, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 70 days.

(21) Appl. No.: 09/604,604

(22) Filed: Jun. 27, 2000

Related U.S. Application Data
(60) Provisional application No. 60/212,294, filed on Jun. 17, 2000.

(51) Int. Cl.$^7$ ................................................ H01M 4/62
(52) U.S. Cl. ..................... 429/232; 429/224; 429/206
(58) Field of Search .................. 429/232, 224, 429/206; 423/596

(56) References Cited

U.S. PATENT DOCUMENTS

| | | | |
|---|---|---|---|
| 3,771,997 A | * 11/1973 | Clark | 148/26 |
| 3,966,490 A | 6/1976 | Auborn | 136/6 LN |
| 4,029,566 A | 6/1977 | Brandmair et al. | 204/290 F |
| 4,042,760 A | 8/1977 | Land | 429/162 |
| 4,140,813 A | 2/1979 | Hund et al. | 427/34 |
| 4,146,438 A | 3/1979 | De Nora et al. | 204/1.5 |
| 4,160,060 A | * 7/1979 | Bynum, Jr. | 166/364 |
| 4,160,069 A | 7/1979 | Johnson et al. | 429/104 |
| 4,243,503 A | 1/1981 | Lieb et al. | 204/290 F |
| 4,252,629 A | 2/1981 | Bewer et al. | 204/290 F |
| 4,422,917 A | 12/1983 | Hayfield | 204/196 |
| 4,483,785 A | 11/1984 | Johnson et al. | 252/520 |

(List continued on next page.)

FOREIGN PATENT DOCUMENTS

| | | | |
|---|---|---|---|
| DE | 3337568 | 4/1985 | H01M/4/50 |
| DE | 19617512 | 5/1996 | H01M/4/50 |
| DE | 19546333 | 6/1996 | H01M/4/66 |
| EP | 0443230 | 8/1994 | H01M/4/86 |
| EP | 0478152 | 8/1995 | C01G/23/04 |
| GB | 2274195 | 7/1994 | H01M/4/48 |
| JP | 61106414 | 5/1986 | C01G/23/04 |
| JP | 63206314 | 8/1988 | C01B/21/08 |
| JP | 63206315 | 8/1988 | C01B/21/08 |
| JP | 01290529 | 11/1989 | C01G/23/04 |
| JP | 08 071418 A | * 3/1996 | B01J/23/20 |
| WO | 9217910 | 10/1992 | H01M/4/50 |
| WO | 9727344 | 7/1997 | H01M/4/68 |
| WO | 9815987 | 4/1998 | H01M/4/62 |
| WO | 0079622 | 12/2000 | H01M/4/62 |

OTHER PUBLICATIONS

Henshaw et al., J. Mater. Chem. (1996) 6(12) 1883–1887 Abstract Only.*

Gasgnier et al., "Pure and mixed titanium, niobium, and vanadium oxides as sputtered thick and thin films: crystallographic properties and phase transitions", Thin Solid Films (1990), 187(1), 25–37 Abstract Only.*

(List continued on next page.)

*Primary Examiner*—Carol Chaney
(74) *Attorney, Agent, or Firm*—Russell H. Toye, Jr.

(57) ABSTRACT

A novel compound that is useful as a battery additive is represented by the formula $$Ti_{1-x}M_xO_{2-y}$$

where M is an element having an octagonal coordination structure, x is from about 0.01 to about 0.5, and y is from about 0.05 to about 0.25. The novel compounds are highly conductive as compared with conventional titanium dioxide additives, and have an expanded rutile crystal structure. The novel compounds are prepared by mixing titanium dioxide with an oxide of M, heating the mixture to form a doped titanium oxide, and reducing the doped titanium oxide.

24 Claims, 8 Drawing Sheets

U.S. PATENT DOCUMENTS

| | | | | |
|---|---|---|---|---|
| 4,668,501 | A | | 5/1987 | Shibuta et al. ............... 423/608 |
| 4,912,286 | A | | 3/1990 | Clarke .................... 174/110 A |
| 4,931,213 | A | * | 6/1990 | Cass ......................... 252/502 |
| 4,936,970 | A | | 6/1990 | Weinberg et al. ........... 204/242 |
| 4,971,666 | A | | 11/1990 | Weinberg et al. ......... 204/59 R |
| 5,017,466 | A | | 5/1991 | Kobayashi et al. ......... 430/558 |
| 5,106,709 | A | | 4/1992 | Tekkanat et al. ............ 429/210 |
| 5,126,218 | A | | 6/1992 | Clarke ........................ 429/245 |
| 5,173,215 | A | | 12/1992 | Clarke ........................ 252/520 |
| 5,281,496 | A | | 1/1994 | Clarke ........................ 429/218 |
| 5,342,712 | A | | 8/1994 | Mieczkowska et al. ..... 429/224 |
| 5,419,824 | A | | 5/1995 | Weres et al. ................ 204/268 |
| 5,532,085 | A | | 7/1996 | Davis et al. ................ 429/224 |
| 5,569,564 | A | | 10/1996 | Swierbut et al. ............ 424/224 |
| 5,585,041 | A | | 12/1996 | Cass .......................... 252/520 |
| 5,599,644 | A | | 2/1997 | Swierbut et al. ............ 429/224 |
| 5,733,489 | A | | 3/1998 | Hill ............................ 264/125 |
| 5,766,789 | A | * | 6/1998 | James et al. ................ 204/431 |
| 5,895,734 | A | | 4/1999 | Nardi et al. ................ 429/224 |

OTHER PUBLICATIONS

Shevaleevskii, O. I., et al, "Interface Charge Separation Processes in TiO2–based solar cells," *Diffus. Defect Data*, Pt. B (1996), 51–52 (Polycrystalline Semiconductors IV), pp. 547–552. No Month.

't Lam, R. U. E., et al, "Interfacial Phenomena of Some Titanate Photoanodes", *Ber. Bunsenges. Phys. Chem.* 88, (1984), pp. 163–170. No Month.

Tsuzuki, A., et al, "Preparation of Nb–doped $TiO_2$ films by the sol–gel method", *Journal of Materials Science Letters*, 9, (1990), pp. 624–626. No Month.

Okamura, Takeshi, et al. "Junction Properties and Gap States in Nb–Doped $TiO_2$ Thin Films", *Japan J. Appl. Phys.*, vol. 32 (1993) pp. L454–L457. No Month.

Levin, Ernest M., et al, "Phase Diagrams For Ceramists", *American Ceramic Society*, Second Edition (1969). No Month.

Levin, Ernest M., et al, Phase Diagrams For Ceramists, 1969 Supplement, (1969). No Month.

"Titanium Compounds", *Encyclopedia of Chemical Technology*, Fourth Edition, vol. 24, pp. 225–254. No Date.

Claverie, Jean, et al., "Visible Light Response of $Ni^{2+}Nb^{4+}$ Doped–Polycristalline $Tio_2$ Anodes," *Mat. Res. Bull.*, vol. 16, 1981, pp. 1019–1025.

Vandermolen, J., et al., "Investigation on the Kinetics of Electroreduction Processes at Dark $Tio_2$ and $SrTiO_3$ Single Crystal Semiconductor Electrodes," *J. Electrochem. Soc.*, Feb., 1980, vol. 127, No. 2, pp. 324–328.

Karakitsou, Kyriaki, et al., "Effects of Altervalent Cation Doping of $TiO_2$ on its Performance as a Photocatalyst for Water Cleavage," *J. Phys. Chem.*, 1993, vol. 97. pp. 1184–1189.

Salvador, P., "The Influence of Niobium Doping on the Efficiency of n–$TiO_2$ Electrode in Water Photoelectrolysis," *Solar Energy Materials*, vol. 2, (1980) pp. 413–421.

Finklea, Harry O., "Titanium Dioxide ($TiO_2$) and Strontium Titanate ($SrTiO_3$),"*Semiconductor Electrodes*, Studies in Physical and Theoretical Chemistry 55, pp. 43–145.

* cited by examiner

DOPED TITANIUM OXIDE ADDITIVES

CROSS-REFERENCE TO RELATED APPLICATIONS

This application claims priority under 35 U.S.C. §119(e) of the U.S. Provisional Patent Application No. 60/212,294, entitled "Doped Titanium Oxide Additives," filed by Michael F. Mansuetto on Jun. 17, 2000, the entire disclosure of which is incorporated herein by reference.

FIELD OF THE INVENTION

This invention relates to novel compositions of matter and more particularly to doped titanium oxide additives exhibiting high electrical conductivity.

BACKGROUND OF THE INVENTION

Battery manufacturers are continually trying to improve the electrochemical performance of their batteries, since even relatively small improvements of performance characteristics such as discharge capacity, cycle life and shelf life can provide advantages in a highly competitive market. At the same time, the current requirements of electronic devices that are powered by batteries are increasing, and the capacity at higher discharge rates is becoming a more important characteristic for these batteries. This is particularly true of both primary and rechargeable alkaline batteries.

One approach that has been used to improve the discharge capacity and/or cycle life of electrochemical cells is to use performance enhancing additives in the negative electrode, positive electrode and/or electrolyte. Such additives may affect these improvements by reducing the internal resistance of the cells, increasing ionic conductivity, preventing the formation of undesirable byproducts, and so forth.

Evans (U.S. Pat. No. 4,465,747) discloses a nonaqueous cell with an organic solvent electrolyte and a cathode containing $MnO_2$ and a minor amount of an additive selected from the group consisting of borates, silicates, molybdates, phosphates, aluminates, niobates, tantalates, titanates, vanadates, zirconates, manganates, cobaltates and tungstenates of alkali metals or alkaline earth metals. Langan (U.S. Pat. No. 4,478,921) discloses a nonaqueous cell with a cathode containing $MnO_2$ and a minor amount of $MnCO_3$. The purpose of these additives is to minimize the increase in internal impedance of the cell during storage or discharge. The additive is believed to prevent degradation of the electrolyte caused by reaction of the electrolyte with surface acidic groups on the $MnO_2$ or incompletely neutralized salts used in preparing the electrolyte solution.

Taucher et al. (PCT Patent Publication No. WO 93/12551) disclose primary and rechargeable alkaline $Zn/MnO_2$ cells with barium compounds (e.g., oxide, hydroxide or sulfate) added to the cathode to improve cell capacity. The barium compound slows down the formation of hetaerolite, which cannot participate in the cycling process and tends to expand and destroy the cathode structure. Cathode additives for improving the capacity of alkaline $Zn/MnO_2$ cells have been disclosed. Swierbut et al. disclose the use of one or more of $SnO_2$, $Fe_2O_3$—$TiO_2$, $TiO_2$ (P-25), $BaTiO_3$, $K_2TiO_3$, $Nb_2O_5$ and SnO in U.S. Pat. No. 5,599,644. Nardi et al. disclose the use of at least one of $SrTiO_3$ or $CoTiO_3$ in U.S. Pat. No. 5,895,734. $CaWO_4$, $MgTiO_3$, $BaTiO_3$, $CaTiO_3$, $ZnMn_2O_4$ and $Bi_{12}TiO_{20}$ are disclosed by Davis et al. U.S. Pat. No. 5,532,085. Mieczkowska et al. disclose the use of $Bi_2O_3$, $PbO_2$, $SnO_2$, $Co_3O_4$, $CoO$, $Bi_2O_3 \cdot 3ZrO_3$ and $K_2Cr_2O_7$ in U.S. Pat. No. 5,516,604. In U.S. Pat. No. 5,342,712, Mieczkowska et al. teach that the useful service life of primary alkaline $Zn/MnO_2$ cells can be extended as a result of increased mobility of ionic flow during discharge by adding anatase $TiO_2$ to the cathode.

While there may be advantages to using such additives, in many cases the advantages can be at least partially offset, particularly on heavy drains, by the relatively high resistivities of the additives which increase the internal resistance of the cell.

It is known that the physical and electrochemical properties of semiconductor materials such as $SiO_2$, $TiO_2$ and $SnO_2$ can be modified by doping those materials with other cations. This approach has been used to modify materials for use in the fields of semiconductors, photoelectrochemistry and solid state sensors. For example, Unexamined Japanese Patent Publication No. 10-316,429 discloses that anatase $TiO_2$ is suitable for use as a white electroconductive powder in the manufacture of semiconductors if it is doped with zinc or aluminum and its surface is coated with an electroconductive film of metal oxide. Karakitsou et al. disclose the use of cation doped $TiO_2$ exhibiting improved performance as a photocatalyst in water cleavage in the *Journal of Physical Chemistry*, 1993, vol. 97, pages 1184–1189. Katayama et al. disclose the use of $Nb_2O_5$-doped $TiO_2$ ceramics exhibiting improved humidity sensitivity.

Traditional $TiO_2$ additives (anatase or rutile) for alkaline batteries are insulating materials that reduce the overall conductivity of the cathode. Conductive forms of titanium oxide exist in the family of Magneli phase substoichiometric titanium oxides with the formula $Ti_nO_{2n-1}$ where n is from 4 to 10. The Magneli phases exhibit different crystal structures than rutile $TiO_2$. WO 97/27344 and EP 0 572 559 disclose that the Magneli phases are useful in electrochemical applications, such as in electrodes of an electrochemical cell.

However, there remains a need for performance enhancing additives for electrochemical cells that provide improved discharge capacity, especially on high current drains, and which provide rechargeable electrochemical battery cells exhibiting improved cycle life.

SUMMARY OF THE INVENTION

One aspect of the invention is a novel compound represented by the formula:

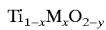

where M is an element having an octagonal coordination structure, x is from about 0.01 to about 0.5, and y is from about 0.05 to about 0.25. These compounds exhibit significantly reduced electrical resistivity as compared with conventional titanium dioxides. The compounds are useful performance enhancing additives for electrochemical battery cells. For example, the novel compounds of this invention may be used in electrochemical battery cells, both primary and secondary (rechargeable), to improve discharge capacity.

Another aspect of the invention is a titanium oxide compound having an expanded rutile crystal structure and a resistivity less than 100 ohm cm.

A further aspect of the invention is a process for making a compound represented by the formula:

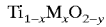

where M is an element having an octagonal coordination structure, x is from about 0.01 to about 0.5, and y is from about 0.05 to about 0.25. The process generally comprises mixing titanium dioxide with an oxide of M; heating the mixture for a time and at a temperature that are sufficient to cause reaction of the titanium oxide with the oxide of M to form a doped titanium oxide, and subjecting the doped titanium oxide to a reducing atmosphere to remove oxygen atoms from the doped titanium oxide.

In another aspect of the invention, a titanium oxide compound having an expanded rutile structure and a resistivity less than 100 ohm-cm is prepared by a process comprising mixing titanium dioxide with an oxide of M, heating the mixture for a time and at a temperature that are sufficient to cause reaction of the titanium dioxide with the oxide of M to form a doped titanium oxide, and subjecting the doped titanium oxide to a reducing atmosphere to remove oxygen atoms from the doped titanium oxide.

Other aspects of the invention involve the use of the compounds described above in electrodes and electrochemical battery cells.

These and other features, advantages and objects of the present invention will be further understood and appreciated by those skilled in the art by reference to the following specification, claims and appended drawings.

DESCRIPTION OF THE PREFERRED EMBODIMENTS

The novel compounds of this invention are reduced doped titanium oxides that are highly conductive (have a low electrical resistivity) as compared with conventional titanium dioxide additives used for enhancing performance of electrochemical battery cells. A conductive form of titanium oxide for alkaline battery cathodes is desired to improve the conductivity of the cathode while continuing to provide the performance improvement associated with traditional insulating titanium dioxide additives. The novel reduced doped titanium oxides in accordance with this aspect of the invention are represented by the formula $Ti_{1-x}M_xO_{2-y}$, where M is an element having an octagonal coordination structure, x is from about 0.01 to about 0.5, and y is from about 0.05 to about 0.25. The conductive, doped titanium oxides in accordance with this aspect of the invention have an electrical conductivity that is comparable to that of the Magneli phase substoichiometric titanium oxides. However, the conductive, doped titanium oxides in accordance with this aspect of the invention have an expanded rutile crystal structure, that is substantially the same as the rutile structure of conventional insulating titanium dioxide additives that provide significant performance improvements in alkaline electrochemical battery cells, whereas the Magneli phase substoichiometric titanium oxides have a significantly different crystal structure.

Element M in the conductive, doped titanium oxides of this invention is selected from elements that can be substituted for a titanium atom in the rutile crystal lattice. Such elements are generally metals having an octagonal coordination structure. Suitable elements M include but are not limited to niobium, vanadium, tantalum, tungsten, zirconium, hafnium, iron, cobalt, nickel, chromium and molybdenum, with niobium being preferred.

The value of x is from about 0.01 to about 0.5, with values from about 0.05 to about 0.2 being preferred, and a value of from about 0.07 to about 0.2 being more preferred. Conductive, doped titanium oxide compounds in accordance with the invention are believed to exhibit the best performance enhancing characteristics when used as an additive for a manganese dioxide electrode when the value of x is about 0.1.

The value of y for the conductive, doped titanium oxides represented by the above formula is from about 0.05 to about 0.25, preferably from about 0.1 to about 0.25, and more preferably from about 0.15 to about 0.25. In general, higher values of y are more electrically conductive (have a lower electrical resistivity). Accordingly, compounds having a value of y that approaches 0.25 are preferred.

Titanium dioxide occurs in nature in three crystalline forms: anatase, brookite, and rutile. Rutile is the thermodynamically stable form at all temperatures. Calorimetric studies have demonstrated that rutile is more stable than anatase and that brookite has a stability intermediate between anatase and rutile.

Figure 6:
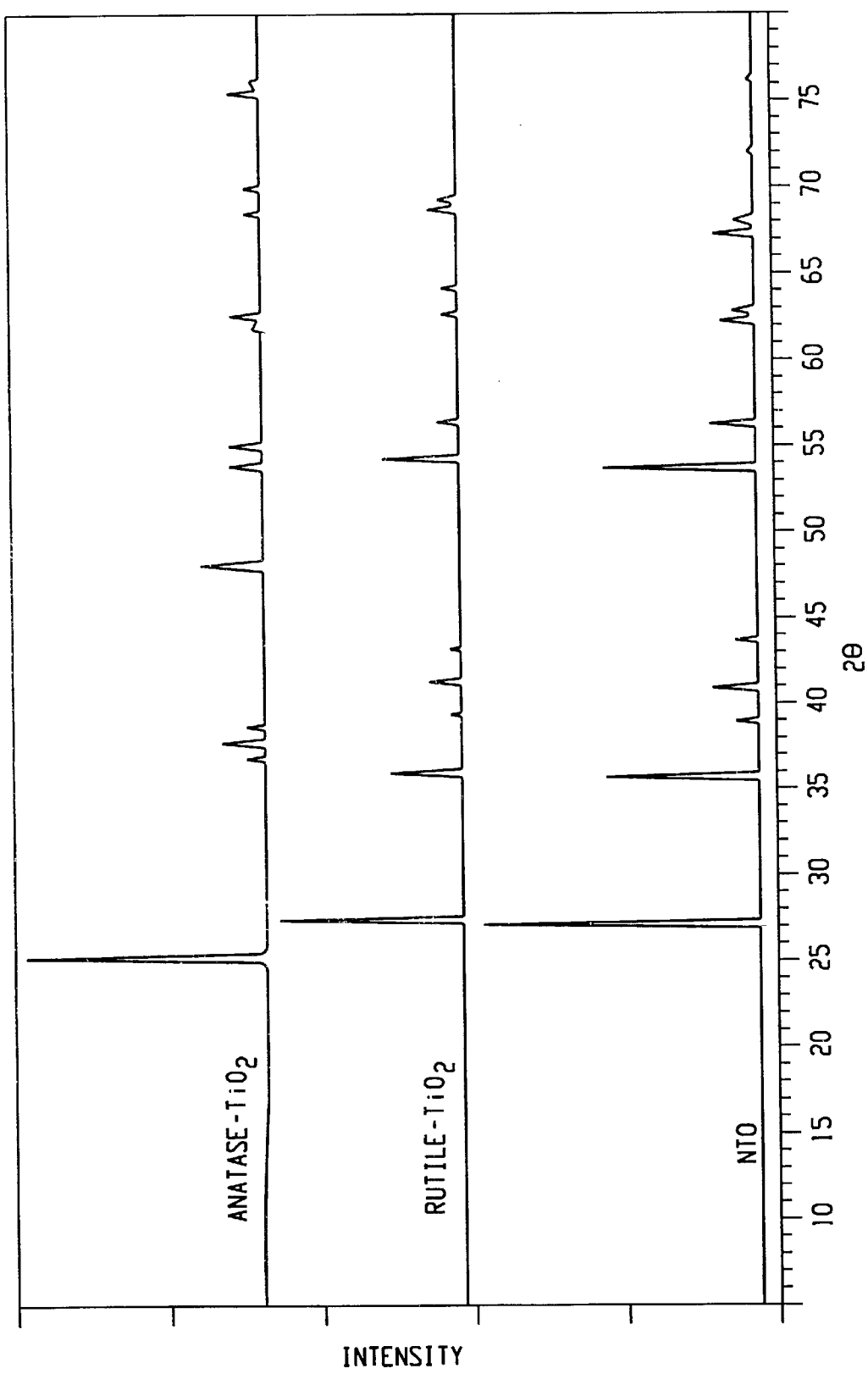
FIG. 6 is a X-ray diffraction pattern comparing anatase titanium dioxide, rutile titanium dioxide and a conductive, niobium-doped titanium oxide in accordance with the invention.

FIG. 6 compares the X-ray diffraction patterns of anatase titanium dioxide, rutile titanium dioxide, and a conductive, niobium-doped titanium oxide (NTO) in accordance with an aspect of this invention. The diffraction peaks for NTO are shifted to a slightly lower 2θ value compared with pure rutile titanium dioxide. From Bragg's Law ($n\lambda = 2\,d\sin\theta$), the lower 2θ value corresponds to a higher d spacing and an expanded lattice. The doping of $Nb^{5+}$ for $Ti^{4+}$ in the rutile structure causes this expanded lattice for NTO. The lattice parameters for NTO may be measured from the powder diffraction pattern and are compared with pure rutile titanium dioxide in Table 1. The space groups and lattice parameters for anatase titanium dioxide are also shown to further highlight the differences among the materials.

TABLE 1

| Material | Space Group | a(Å) | c(Å) |
| --- | --- | --- | --- |
| NTO | P4$_2$/mnm | 4.619 | 2.971 |
| Rutile-TiO$_2$ | P4$_2$/mnm | 4.593 | 2.959 |
| Anatase-TiO$_2$ | I4$_1$/amd | 3.785 | 9.514 |

Figure 7:
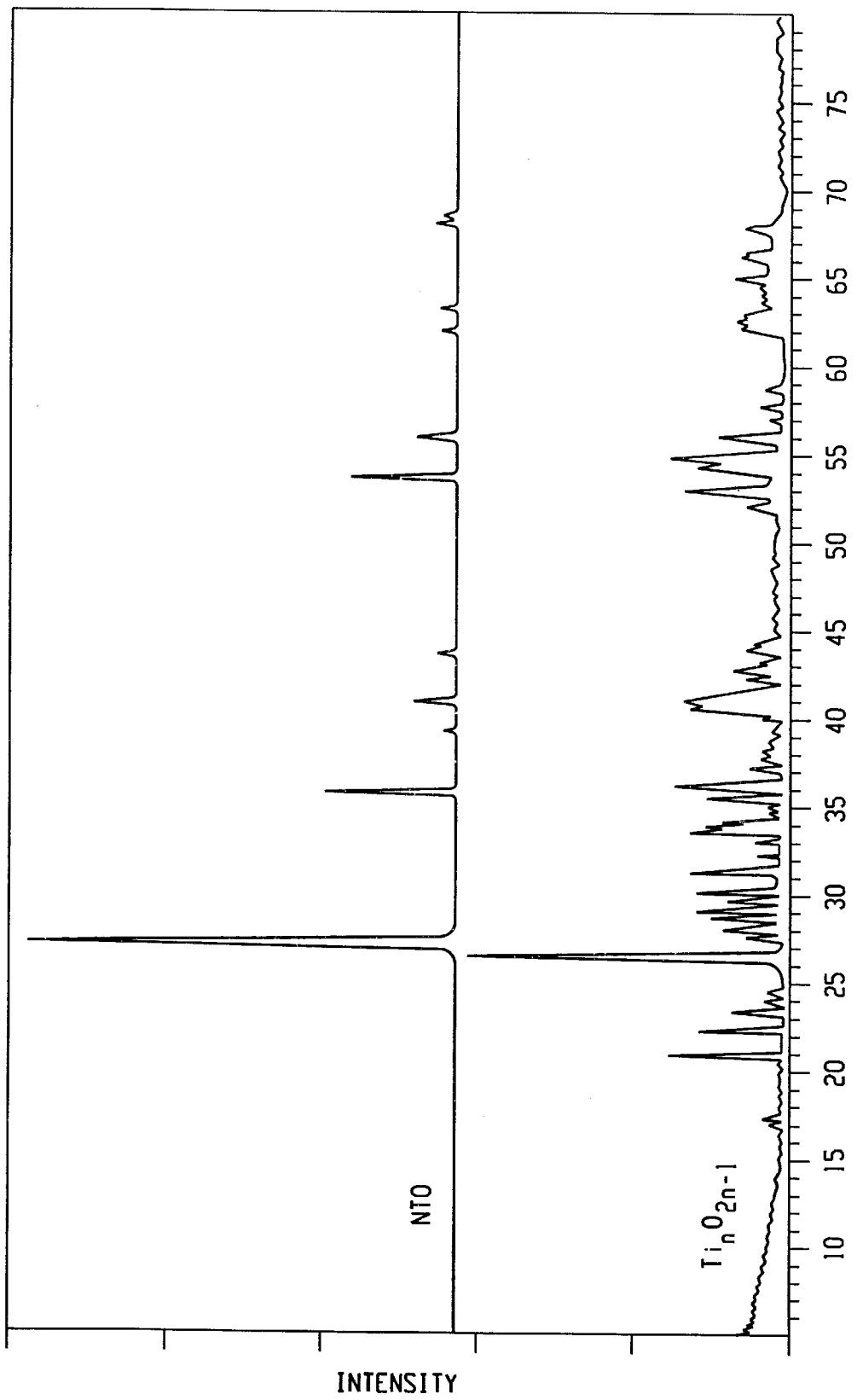
FIG. 7 is a comparison of the X-ray diffraction pattern of a commercially available Magneli material with the diffraction pattern of a conductive, niobium-doped titanium oxide in accordance with the invention.

The crystal structures of the Magneli phases are comprised of rutile titanium dioxide blocks separated by TiO layers. The number of TiO layers increases as n (in the formula $Ti_nO_{2n-1}$), decreases from 10 to 4. The diffraction pattern of a commercially available Magneli phase material is compared with the diffraction pattern of NTO in FIG. 7. The two materials clearly have different structures. NTO retains the rutile titanium dioxide structure upon loss of oxygen, whereas the Magneli phase material transforms to a different structure as it loses oxygen.

Anatase titanium dioxide and rutile titanium dioxide are white powders, whereas NTO and commercially available Magneli materials are dark blue-black. The color of a material may be further described more quantitatively using the Munsell notation. The Munsell notation system is described in *The Munsell Book of Color*, Munsell Color, Macbeth Division of Kollmorgen Instruments Corporation, New York. The Munsell Color-order system is a way of precisely specifying colors and showing the relationship among colors. Every color has three qualities or attributes: hue, value and chroma. Munsell established numerical scales with visually uniform steps for each of these attributes. *The Munsell Book of Color* displays a collection of colored chips arranged according to the scales. Each chip is identified numerically using these scales. The color of any material can be identified by comparing it to the chips under proper illumination and viewing conditions. The colors are then identified by hue, value and chroma. These attributes are given the symbols H, V and C, and are written in a form "H V/C," which is called the Munsell notation. Using the Munsell notation system, NTO may be described as having a hue of 10B, a value of 3, and a chroma of 2. The notation for a neutral color, under the Munsell notation system, is written as "N V/." The chroma of a neutral color is 0, but is customarily omitted from the notation. The Munsell color notation for anatase titanium dioxide is "N 9/."

The conductive, doped titanium oxides in accordance with an aspect of this invention exhibit significantly improved electrical conductivity as compared with anatase titanium dioxide. The improved conductivity is attributed to the loss of oxygen from the lattice upon heating in a reducing atmosphere. The resistivity of NTO is comparable to that of commercially available Magneli phase materials. Anatase titanium dioxide has a resistivity of about $10^6$ ohm-cm. The commercially available Magneli phase materials and the conductive doped titanium oxide materials in accordance with an aspect of this invention have electrical resistivities that are several orders of magnitude less than anatase titanium dioxide. In particular, the resistivities of the conductive doped titanium oxide materials in accordance with an aspect of this invention are less than 100 ohm-cm, and are preferably about 10 ohm-cm or less.

The conductive, doped titanium oxides in accordance with an aspect of this invention are prepared by high temperature reaction of titanium dioxide and an oxide of M in a reducing atmosphere to form an electrically conductive ceramic powder with the formula $Ti_{1-x}M_xO_{2-y}$. As an example, the reaction of titanium dioxide with $Nb_2O_5$ is represented as follows:

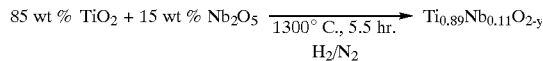

wherein y is defined above.

The novel conductive doped titanium oxide materials of this invention may be prepared by intimately mixing a titanium dioxide with an oxide of an element selected from niobium, vanadium, tantalum, tungsten, zirconium, hafnium, iron, cobalt, nickel, chromium and molybdenum. A suitable degree of mixing may be achieved by wet mechanical mixing or by dry mechanical mixing. It is highly desirable to achieve intimate mixing to minimize the distance that material must travel in the solid state. Stated differently, the more intimate the mixing of the titanium dioxide and the dopant, the faster the reaction will progress to completion. In order to achieve the desired intimate mixing, it is preferred that smaller particle sizes be used. Suitable particle sizes for the titanium dioxide and the dopant are from about 1 microns to about 5 microns, with particle sizes below 2 microns being preferred. Larger particle sizes may be used, but will tend to increase the time and/or amount of heat needed to complete the reaction in high yield. The titanium dioxide starting material may comprise any phase (e.g., brookite, rutile or anatase). Examples of suitable dopants include $Nb_2O_5$, $NbO_2$, $Ta_2O_5$, $WO_3$, $ZrO_2Fe_2O_3$, etc.

The amount of dopant material that is mixed with the titanium dioxide is determined stoichiometrically based on the desired value of x in the formula $Ti_{1-x}M_xO_{2-y}$.

When wet mixing is used, it is desirable to add a dispersant to prevent agglomeration of the titanium dioxide and dopant particles. Suitable dispersants are well known and include inorganic acids, inorganic bases, organic acids, organic bases, poly(acrylic acid), salts of poly(acrylic acid), poly(methacrylic acid), salts of poly(methacrylic acid), copolymers of poly(acrylic acid), salts of copolymers of poly(acrylic acid), copolymers of poly(methacrylic acid), salts of copolymers of poly(methacrylic acid), poly (ethyleneimine), polyvinylpyrrolidone, polyacrylamide, lignosulfonates, poly(ethylene oxide), adducts of ethylene oxide, adducts of propylene oxide, polycarboxylates, salts of polycarboxylates, naphthalene sulfonates, sulfosuccinates, polyphosphates, sodium silicates, phosphate esters, and mixtures thereof. An example of a suitable commercially available dispersant is sold under the name "Darvan® 821A" (R. T. Vanderbilt Corp.). A suitable amount of dispersant is, for example, about 0.5% of the total weight of the titanium dioxide and dopant materials.

After wet mechanical mixing, the mixture is dried, such as by spray drying, to recover a powder.

In order to improve material handling properties, such as flowability and pumpability, of the mixture of titanium dioxide and dopant, it may be desirable to add a small amount of a binder, such as polyvinylacetate. When a binder is used, it is typically used in an amount of about 1% or less by weight. When a binder is used, it will decompose at the reaction temperatures, and, therefore, will not appreciably affect the properties of the reaction product.

The reaction of the titanium dioxide with the dopant is typically conducted at a temperature of from about 1100° C. to about 1400° C., with the reaction time being from about 30 minutes to several hours. For any particular mixture, there is a tradeoff between temperature and reaction time, i.e., the reaction will proceed to completion more quickly at higher temperatures. During the heating process, the element M (e.g., niobium) from the dopant is incorporated into the titanium dioxide structure (anatase, rutile or brookite), and any anatase or brookite is rearranged to form rutile. The incorporation of the dopant element (M) into the titanium dioxide structure, and any rearrangement from brookite or anatase to rutile, is preferably achieved before oxygen is removed from the crystal lattice to prevent formation of the Magneli phases. The desired incorporation of dopant element and any necessary rearrangement from anatase or brookite to rutile may be achieved in a reducing atmosphere by initially heating the mixture to a temperature at which substitution of the dopant element into the titanium dioxide structure and rearrangement occur at an appreciable rate, but oxygen removal from the crystal lattice does not occur at an appreciable rate, and gradually increasing the temperature of the mixture to a level at which oxygen removal does occur at an appreciable rate. Alternatively, the desired conductive, doped titanium oxide materials may be prepared by heating the mixture in an oxygen atmosphere to cause a dopant element in the mixture to become incorporated into the titanium dioxide structure, and to cause any brookite or anatase to be converted to rutile, and subsequently removing the oxygen atmosphere and replacing it with a reducing atmosphere. An example of a suitable reducing atmosphere is an atmosphere comprised of a mixture of hydrogen and nitrogen. Higher hydrogen concentrations are more effective (i.e., result in faster removal of oxygen from the crystal lattice). However, for purposes of safety a hydrogen content of about 5% by weight may be preferred.

Suitable apparatuses for heating the mixture to achieve the desired reaction include rotary furnaces, push or belt furnaces, and batch furnaces. Rotary furnaces are preferred because of their ability to achieve complete reaction in a residence time of as little as about 30 minutes, whereas a typical reaction time for a push or belt furnace is about 5.5 hours using the same temperatures and reactants. Batch furnaces are not preferred because they require heating and cooling of the furnace for each batch.

After the reactions have been completed (i.e., incorporation of a dopant element into the titanium structure, any rearrangement from anatase or brookite to rutile, and a desired amount of oxygen removal from the crystal lattice), the product is preferably allowed to cool in an oxygen-free atmosphere to prevent oxygen from being incorporated into the crystal lattice. It is desirable that the product is allowed to cool in an oxygen-free atmosphere to a temperature of about 300° C. or less, more preferably to a temperature of about 100° C. or less, and even more preferably to a temperature of about 50° C. or less.

Electrochemical cells of this invention include both primary and rechargeable cells for use in batteries. The cells may have aqueous or nonaqueous electrolytes. Examples of cell types with nonaqueous electrolytes are $Li/MnO_2$ and lithium ion cells. Examples of cells having an aqueous electrolyte include cells having an alkaline electrolyte, such as an aqueous solution of KOH and/or NaOH. Other cells having an aqueous electrolyte include zinc chloride carbon-zinc cells with electrolytes comprising aqueous solutions of $NH4OH$ and $ZnCl_2$. Examples of suitable electrochemical systems having an aqueous alkaline electrolyte include $Zn/MnO_2$, $Mg/MnO_2$, $Al/MnO_2$, $Zn/Ag_2O$, $Zn/HgO$, Ni/Cd, NiMeH, and NiH. $Zn/MnO_2$ is a preferred system.

Figure 8:
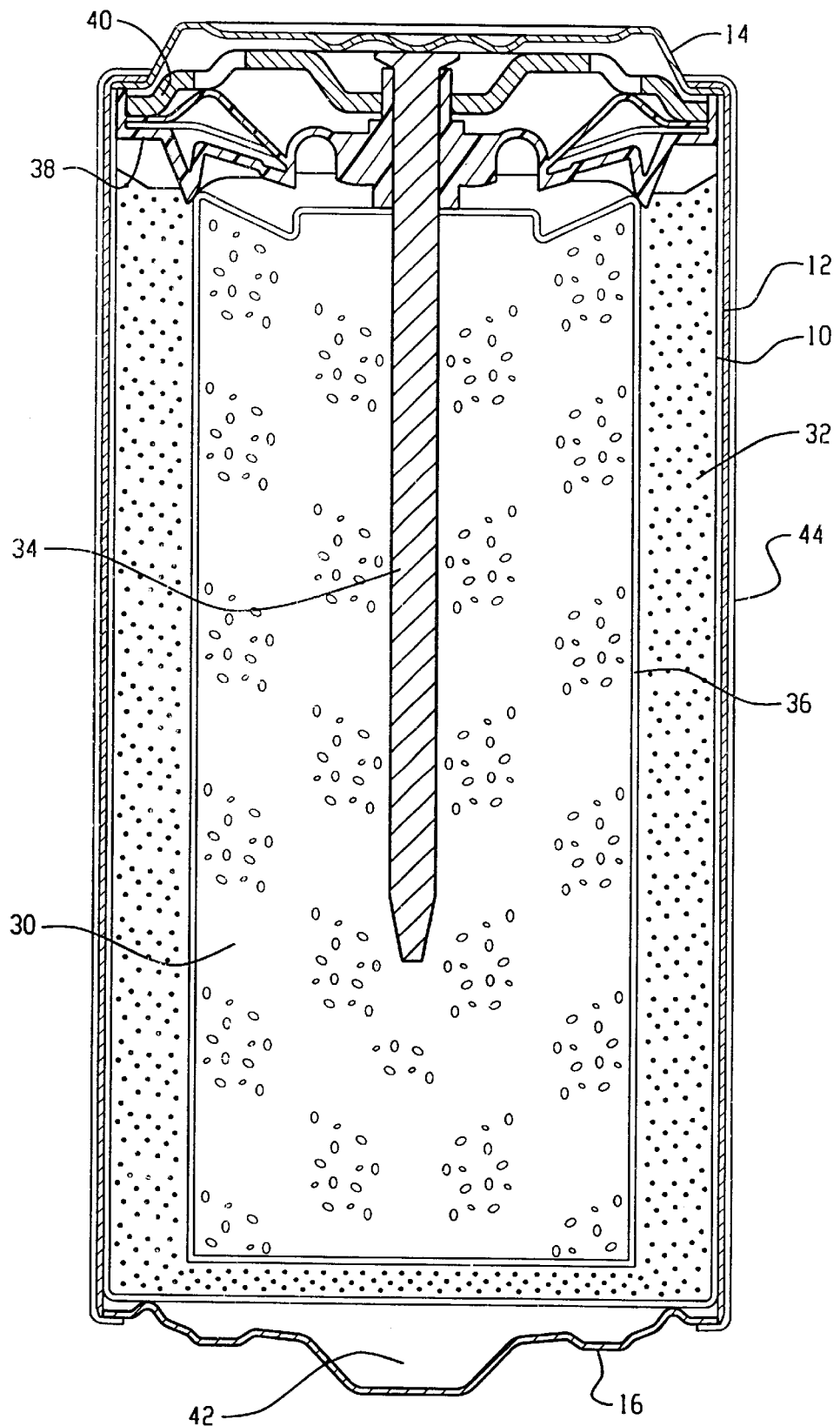
FIG. 8 is a cutaway view of an alkaline battery employing an additive in accordance with the invention.

In FIG. 8, there is shown a cutaway view of an alkaline battery, including a steel can 10 having a cylindrical shape. A cathode 32 formed of a mixture comprising manganese dioxide, a conductive, doped titanium oxide compound in accordance with the invention, graphite, potassium hydroxide solution, de-ionized water, an aqueous solution, and additives, is formed about the interior surface of can 10. A separator 36 is located about the interior surface of cathode 32. An electrolyte 30 formed of potassium hydroxide is disposed in the interior of separator 36. An anode, which may be formed of zinc powder, a gelling agent and other additives, is disposed within electrolyte 30 in contact with a current collector 34. The alkaline battery shown in FIG. 8 is illustrative of a battery employing the conductive, doped titanium oxide materials of this invention in an electrode of a battery. However, those having ordinary skill in the art will understand that the doped titanium dioxides of this invention may be employed in various other types of batteries, including both primary and secondary batteries, and in batteries having various configurations.

The modified additive may initially be put into one or more of the negative electrode, positive electrode, and electrolyte. After the cell is assembled, the modified additive may migrate to other parts of the cell. The preferred initial location of the modified additive can depend upon a number of factors, including the cell component to be affected, the desired type of effect, and the mobility of the modified additive. Preferred additives are insoluble in the electrolyte.

The amount of modified additive used in the cell depends on a number of factors. The preferred amount of unmodified additive is a good indicator of the preferred amount of modified additive. However, by increasing the effectiveness of the additive, it may be possible to achieve the same effect with less modified additive, or, if the modified additive has a lower resistivity, it may be possible to add more of the modified additive without increasing the internal resistance of the cell to an undesirable level. Preferably the amount of modified additive is no more than about 20 wt %, based on the weight of active material in either the anode or the cathode, whichever contains less. If the modified additive has sufficient electrical conductivity, it may be possible to reduce the amount of inert conductive material used in the electrode and still further increase the capacity of the cell.

Certain aspects of the invention are described below with respect to specific illustrative examples. These examples are intended to facilitate understanding of the principles and advantages of the invention. However, the scope of the invention is to be determined by the appended claims, and is not limited by the illustrative examples.

EXAMPLE 1

$TiO_2$ was reduced with $H_2$ by heating $TiO_2$ for 100 minutes at 980° C. in a hydrogen atmosphere (5% $H_2$ in $N_2$ was used for safety, though a higher concentration would be more effective.) The reduced material was a fine powder that did not require grinding and sieving before use. Dry cathode mix was prepared by blending EMD and synthetic graphite, in a 25:1 ratio (by weight), in an analytical mill (Techmar model A-10) for 15 seconds, except that 1.6 wt % of the EMD, based on the total cathode weight, was replaced with niobium-doped $TiO_2$ as a cathode additive. The EMD used was from Kerr McGee and the graphite was grade GA17 from Superior Graphite. The $TiO_2$ used was anatase and the reduced n-$TiO_2$ was rutile.

EXAMPLE 2

Anatase $TiO_2$ was doped with $Nb_2O_5$ by: (a) mixing the desired weight ratios of $TiO_2$ and $Nb_2O_5$ with a mortar and pestle, along with methanol for easier homogenization, (b) pressing the mixture into a pellet, (c) sintering at 1200° C.–1250° C. for 20 hours, and (d) milling. Steps (c) and (d) were repeated for a total of 80 hours of sintering. $TiO_2$ was doped with both 10 wt % and 20 wt % $Nb_2O_5$. The sintering temperature was 1200° C. for the material with 10% dopant and 1250° C. for the material with 20% dopant. The $Nb_2O_5$-doped $TiO_2$ had a rutile structure. It was then prepared for use by grinding with a mortar and pestle and sieving through a 53 μm sieve. Dry cathode mix was prepared in the same manner as in Example 1, but using $Nb_2O5$-doped $TiO_2$ as the additive.

Figure 1:
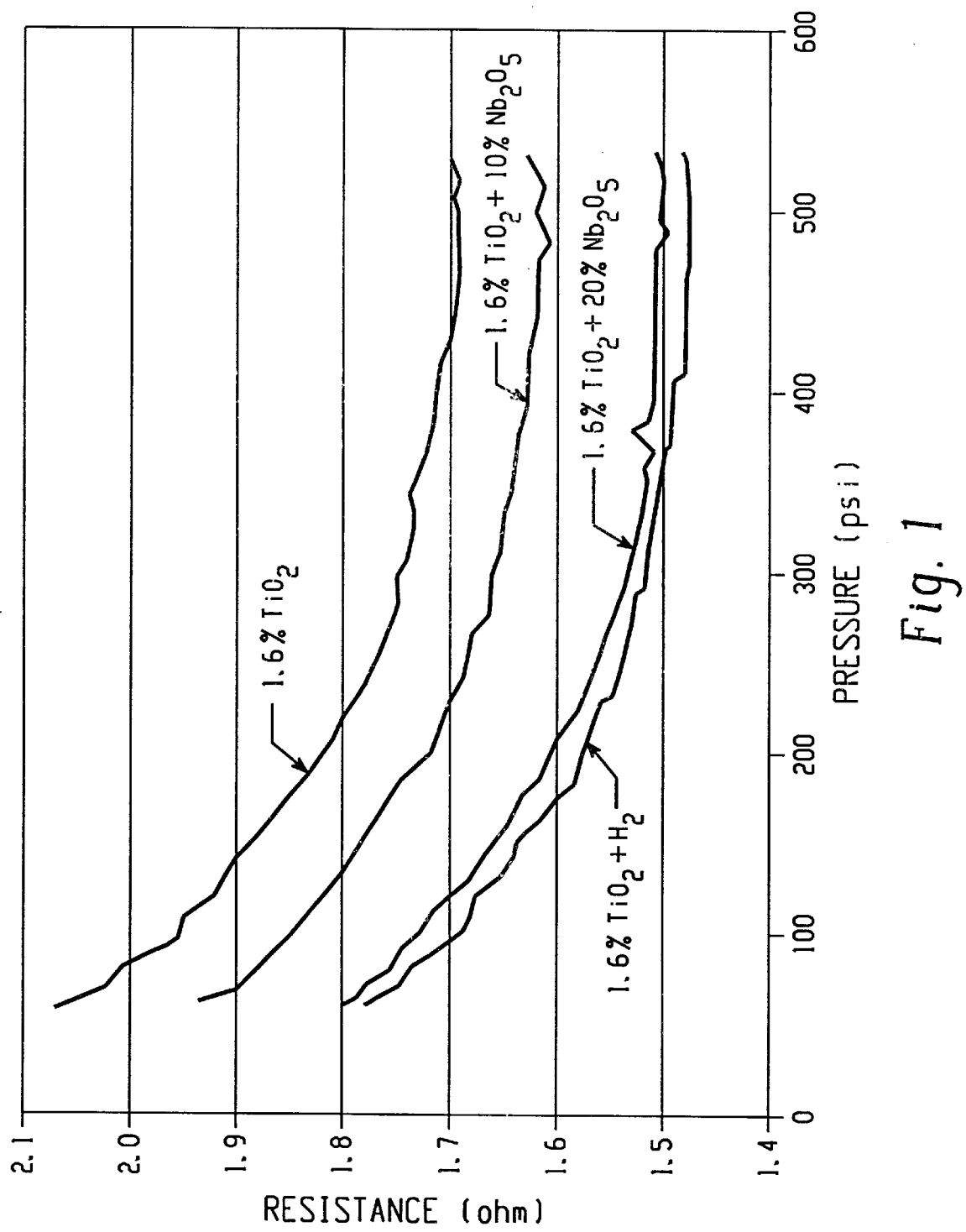
FIG. 1 is a graph of dry cathode resistance as a function of cathode compression for comparative cathodes.

The resistances of the dry cathode mixes described were tested by placing three grams of dry mix into a cylinder made of an electrically nonconductive material, having a 0.50 inch inside diameter and having an electrically conductive base pad. The mix was compressed with an electrically conductive plunger, and the resistance was measured between the plunger and pad during compression of the mix. Results of the resistance test are shown in FIG. 1, which shows the cathode resistance in ohms as a function of pressure in pounds per square inch. Each curve represents the average of three samples. The curve labeled "+1.6% $TiO_2$" represents the cathode mix with anatase $TiO_2$ as an additive, the curve labeled "$TiO_2+H_2$" represents the cathode mix with hydrogen-reduced $TiO_2$ as an additive, the curve labeled "$TiO_2+10\%\ Nb_2O_5$" represents the cathode mix with $TiO_2$ doped with 10 wt % $Nb_2O_5$, and the curved labeled "$TiO_2+20\%\ Nb_2O_5$" represents the cathode mix with $TiO_2$ doped with 20 wt % $Nb_2O_5$. These curves show that the mix containing hydrogen-reduced $TiO_2$ and the mix containing $Nb_2O_5$-doped $TiO_2$ have lower resistance than the mix containing anatase $TiO_2$.

Figure 2:
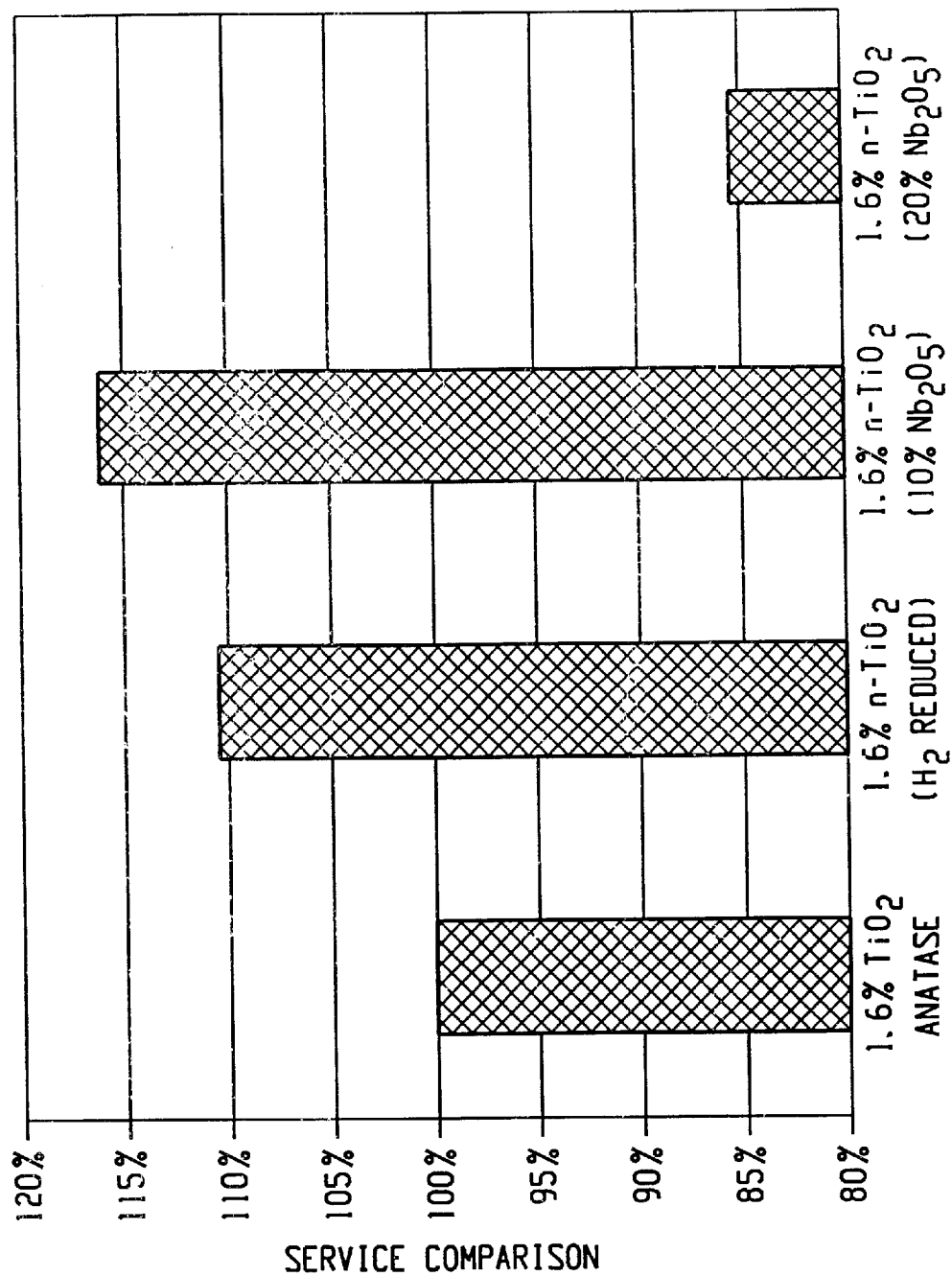
FIG. 2 is a comparison of relative discharge durations of miniature cells with comparative cathodes.

Miniature alkaline $Zn/MnO_2$ cells were made and discharged to evaluate the effects on cell capacity when using doped or hydrogen-reduced $TiO_2$ as a cathode additive. A portion of each of the cathode mixes from Examples 1 and 2 was mixed with 3 wt % of 45% aqueous KOH solution and blended with a mortar and pestle for 5 minutes to produce a wet mix. The wet mix was formed into pellets weighting 0.7175 gram. Each pellet was placed into an IEC R44-size nickel-plated steel can with an inside diameter of 0.447 inch. The can served as the cathode container and positive terminal of the cell. A nickel mesh screen 0.447 inch in diameter was placed on top of the pellet as the current collector, and the pellet was compressed with a hydraulic press to a height of approximately 0.085 inch from the inside surface of the can bottom, producing a formed cathode with about 72 percent solids packing by volume. Two separator discs were placed in the can on top of the formed cathode. A fixture to hold the anode was placed on the top of the can, and an excess amount of gelled anode, based on the theoretical capacity of the cathode pellet, was put into the fixture. The anode contained 70 wt % zinc powder in a 37 wt % aqueous KOH solution gelled with Carbopol. An indium-burnished brass nail was inserted into the anode gel from the top of the anode fixture as a current collector. Each cell was discharged continuously at 85.5 mA to 1.0 volt. This discharge rate was selected because the current density is about equivalent to a 1000 mA discharge rate in an IEC LR6 size cell, based on the interfacial surface area. Results of this test are shown in FIG. 2. Cells with both the hydrogen-reduced and 10% $Nb_2O_5$-doped $TiO_2$ cathode additives performed significantly better than cells with an untreated anatase $TiO_2$ additive. Cells with 20% $Nb_2O_5$ as the cathode additive performed poorly even though the cathode resistance (FIG. 1) was low. It is believed that the capacity was low because not all of the $Nb_2O_5$ was doped into the $TiO_2$, so there was an excess of $Nb_2O_5$ present. The cells with hydrogen-reduced $TiO_2$ additive did not perform as well as would be expected based solely on the cathode resistance test results, possibly due to poor stability of hydrogen-reduced $TiO_2$ with EMD in the KOH electrolyte.

EXAMPLE 3

Figure 3:
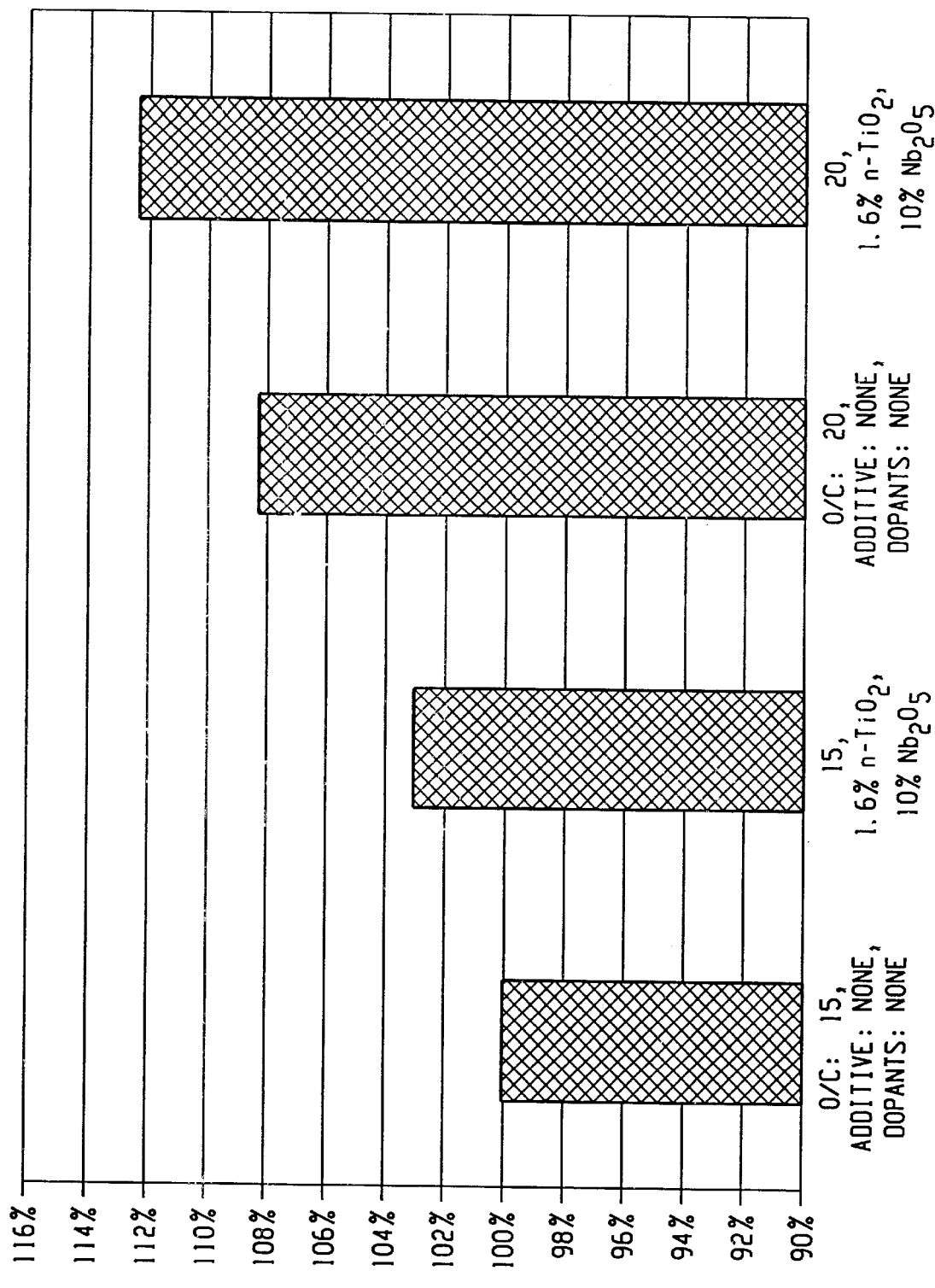
FIG. 3 is a comparison of relative discharge durations of flooded half cells with comparative cathodes.
Figure 4:
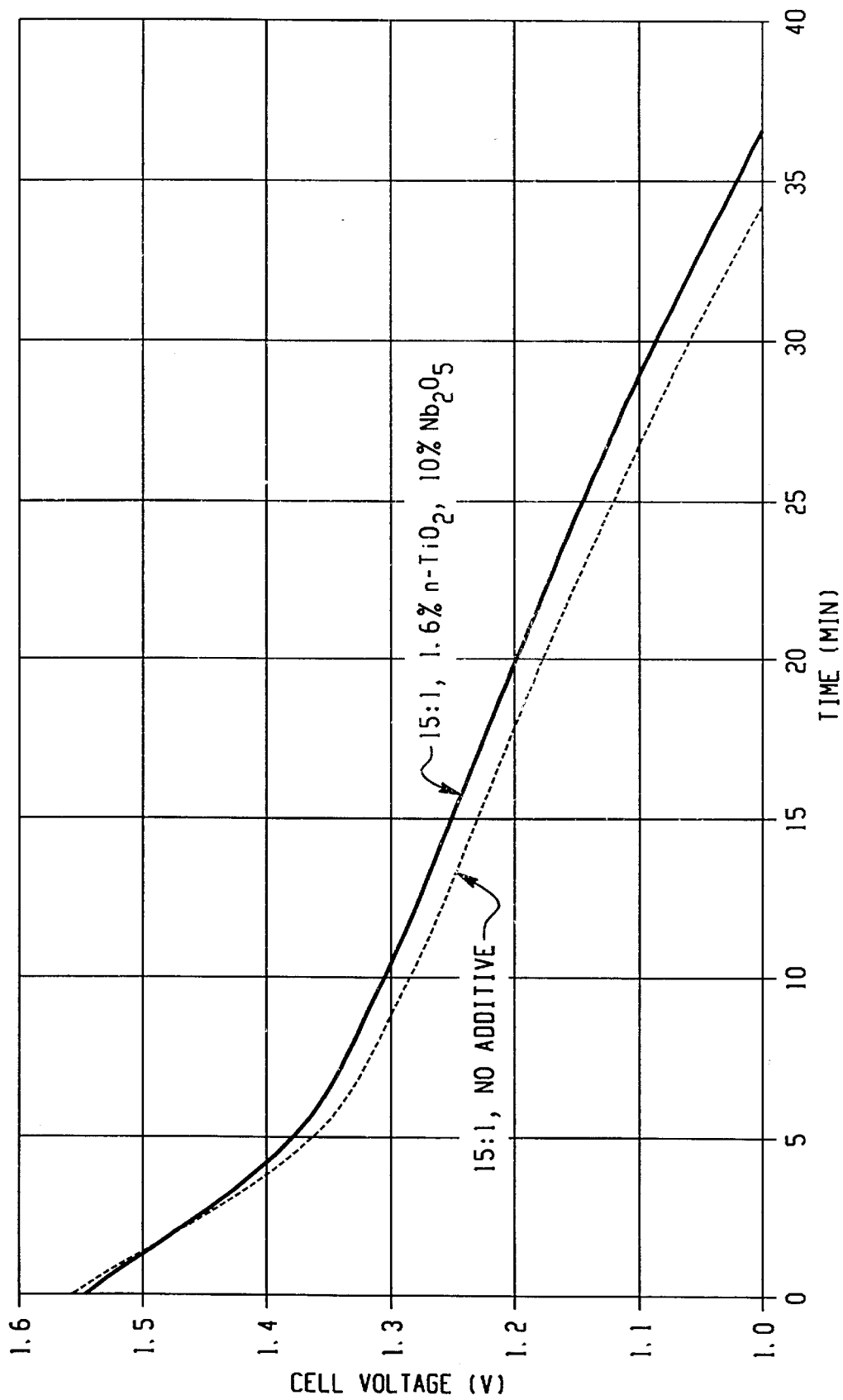
FIG. 4 is a comparison of discharge curves of flooded half cells having comparative cathodes.
Figure 5:
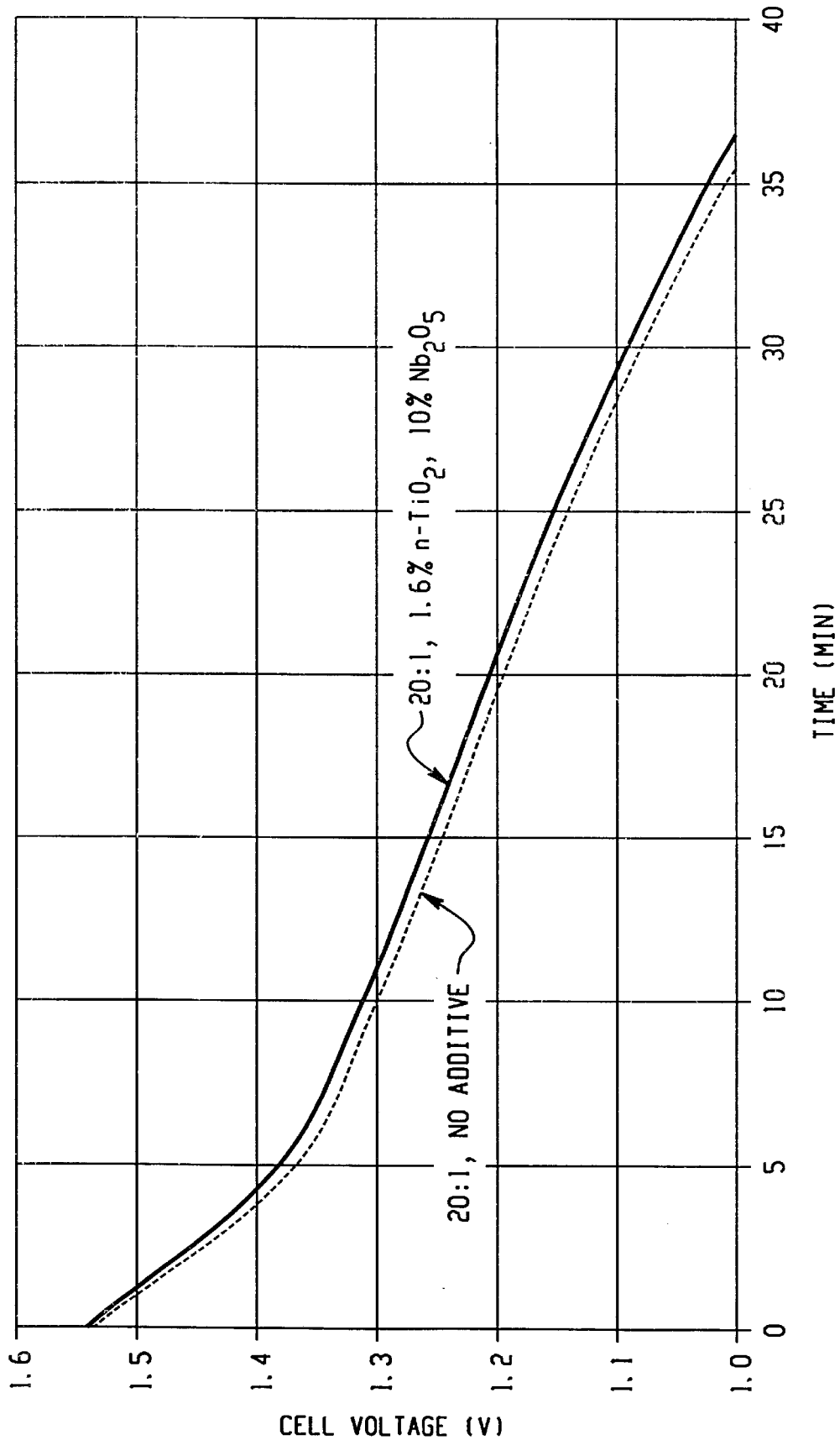
FIG. 5 is a comparison of discharge curves of flooded half cells having comparative cathodes.

Dry cathode mixes were made as described in Example 1, except with EMD:graphite weight ratios of 15:1 and 20:1, rather than 25:1. At each of these two EMD:graphite levels, one mix was made with no cathode additive and the other was made with 1.6 wt % of 10% $Nb_2O_5$-doped $TiO_2$ added, as described in Example 2. Each dry mix was made into a wet mix, pellets were formed and put into cans, and formed cathodes were made as described in Example 2, except that no separators were put into the cans. Each of the formed cathodes was discharged in flooded half cells at 85.5 mA to 1.18 volt, against a zinc reference electrode. The reference electrode contained zinc metal in a gelled 37% aqueous KOH solution. The results of the flooded half cell testing are summarized in FIGS. 3–5. FIG. 3 shows the relative discharge durations. At both EMD:graphite ratios, the cells with the doped $TiO_2$ additive performed better than the cells with no additive. The actual discharge curves are shown in FIGS. 4 and 5.

EXAMPLE 4

A series of AAA size batteries were prepared with a cathode composition comprising 93.22 wt % electrolytic manganese dioxide (EMD), 3.68 wt % graphite, 3.05 wt % of a 45% aqueous potassium hydroxide solution, and 0.05 wt % of polytetrafluoroethylene (PTFE) binder. The anode composition comprised 70.00 wt % zinc, 0.02% $In(OH)_3$, 0.42% gelling agent, 1.17 wt % de-ionized water, and the balance being a potassium hydroxide solution at a concentration sufficient to provide a potassium hydroxide concentration of 37% in the cell electrolyte after assembly. Each cell contained 4.96 grams of the cathode composition and an excess of the anode composition, with an additional 0.95 grams of 37% potassium hydroxide solution added to each cell. The cells were prepared in a conventional manner. The basic steps in cell construction include making a cathode mixture, forming the cathode mixture into rings, inserting the rings into a cell container (can) and compressing the ring to form a cathode with a central cavity, inserting a separator into the central cavity of the cathode, making an anode mixture, depositing the anode mixture in the cavity of the cathode with the separator disposed between the cathode and the anode, adding additional electrolyte solution, and adding an appropriate anode collector and seal for the cell. These cells were used as a standard or control for evaluating batteries prepared with the additives of this invention.

A second series of AAA cells was prepared in a substantially identical manner except that a portion of the EMD was replaced with a conventional anatase titanium dioxide additive so that the cathode contained 1.6% of the additive by weight, or a weight ratio of additive to EMD of about 0.018 to 1.

A third series of AAA cells was prepared that was identical to the second set, except that the conventional anatase titanium dioxide additive was replaced with a niobium-doped rutile titanium oxide in accordance with the invention.

On average, when cells were subjected to a 400 mA continuous discharge to 0.9 volts, the cells containing the anatase did not exhibit an improvement over the control cells. The cells containing a niobium-doped titanium oxide in accordance with the invention exhibited a 4% service improvement over the control cells. At a higher current drain the cells containing a niobium-doped rutile titanium dioxide additive in accordance with the invention outperformed the cells containing the conventional anatase titanium dioxide additive. In particular, the test cells in accordance with the invention exhibited a 3% service improvement over the control cells, whereas the cells containing the anatase additive did not perform as well as the control cells, when subjected to a 600 mA continuous discharge to 0.9 volts. In separate testing, even cells with half the amount of niobium-doped titanium dioxide performed better than cells with no additive or cells with a 0.018 to 1 anatase $TiO_2$ to EMD weight ratio. Even lower levels of the NTO additive of the present invention may be sufficient for improving performance.

EXAMPLE 5

Another series of tests substantially identical to those in Example 4 were conducted, except the final potassium hydroxide concentration in the electrolytes in the AAA cells was 35% rather than 37%. In these tests, cells containing an additive in accordance with the invention significantly outperformed cells containing a conventional anatase titanium dioxide additive. For the 400 mA continuous discharge to 0.9 volts, the cells containing a niobium-doped rutile titanium dioxide additive of the invention exhibited a 15% service improvement with respect to the control, whereas the cells containing the anatase titanium dioxide additive only exhibited a 4% improvement with respect to the control. At a 600 mA continuous discharge to 0.9 volts, the cells containing a niobium-doped rutile titanium dioxide additive in accordance with the invention exhibited a 25% service improvement as compared with the control, whereas the cells containing the anatase additive did not perform as well as the control cells.

EXAMPLE 6

A series of tests similar to those in Examples 4 and 5 were conducted on additives in accordance with the invention to determine the effect of particle size of the additive on service improvement. Additives having an average particle size of 15 microns, 60 microns and 84 microns were tested. All of the additives provided service improvement on both the 400 mA and 600 mA continuous discharge tests. However, the smaller particle sizes appeared to provide the greatest service improvement.

Although the electrochemical cell of the present invention has been described in the above examples as a primary $Zn/MnO_2$ cell having an aqueous KOH electrolyte, it will be appreciated by those skilled in the art that the present invention may be used for primary and rechargeable cells and cells of other electrochemical systems, anode-cathode pairs and/or electrolytes.

It will be understood by those who practice the invention and those skilled in the art that various modifications and improvements may be made to the invention without departing from the spirit of the disclosed concept.

The invention claimed is:

1. A compound represented by the formula:

$$Ti_{1-x}Nb_xO_{2-y}$$

where x is from about 0.01 to about 0.5, y is from about 0.05 to about 0.25, and the compound has a crystal suture that consists of an expanded rutile crystal stucture and a resistivity less than 100 ohm-cm.

2. The compound of claim 1, where x is from about 0.05 to about 0.2.

3. The compound of claim 1 having a color that is characterized in accordance with the Munsell color-order system as having a hue of about 10B, a value of about 3, and a chroma of about 2.

4. The compound of claim 1, wherein y is from about 0.1 to about 0.25.

5. The compound of claim 4, wherein y is from about 0.15 to about 0.25.

6. An electode for an electrochemical battery cell comprising a mixture of manganese dioxide, graphite, and a performance enhancing additive that is a compound represented by the formula:

$$Ti_{1-x}Nb_xO_{2-y}$$

where x is from about 0.01 to about 0.5, y is from about 0.05 to about 0.25, and the additive has an expanded rutile crystal structure and a resistivity less than 100 ohm-cm.

7. The electrode of claim 6, where x is from about 0.05 to about 0.2.

8. The electrode of claim 7, wherein x is from about 0.07 to about 0.2.

9. The electrode of claim 6, wherein the additive has a color that is characterized in accordance with the Munsell color-order system as having a hue of about 10B, a value of about 3, and a chroma of about 2.

10. The electrode of claim 6, wherein the electrochemically active material is electrolytic manganese dioxide (EMD).

11. The electrode of claim 6, wherein the cathode mixture further comprises a binder.

12. The electrode of claim 6, wherein x is less than 0.2.

13. An electrochemical battery cell comprising an anode, a cathode, a separator between the anode and the cathode, and an electrolyte, wherein at least one of the anode, cathode and electrolyte contains a performance enhancing additive that is a titanium oxide compound represented by the formula:

$$Ti_{1-x}Nb_xO_{2-y}$$

where x is from about 0.01 to about 0.5, y is from about 0.05 to about 0.25, and the additive has an expanded rutile structure and a resistivity less than 100 ohm-cm.

14. The battery cell of claim 13, where x is from about 0.05 to about 0.2.

15. The battery cell of claim 14, wherein x is from about 0.07 to about 0.02.

16. The battery cell of claim 13, wherein the additive has a color that is characterized in accordance with the Munsell color-order system as having a hue of about 10B, a value of about 3, and a chroma of about 2.

17. The battery cell of claim 13, wherein the manganese dioxide is electrolytic manganese dioxide (EMD).

18. The battery cell of claim 13, wherein the cathode mixture further comprises a binder.

19. The battery cell of claim 13, wherein x is less than 0.2.

20. The battery cell of claim 13, wherein a weight ratio of the additive to the manganese dioxide is about 0.018:1 or less.

21. The battery cell of claim 20, wherein a weight ratio of the additive to the manganese dioxide is from about 0.009:1 to about 0.018:1.

22. The battery cell of claim 13, wherein a weight ratio of the additive to the manganese dioxide is about 0.009:1 or less.

23. The battery cell of claim 13, wherein the cathode mixture further comprises a binder.

24. A process for making a compound represented by the formula:

$$Ti_{1-x}Nb_xO_{2-y}$$

where x is from about 0.01 to about 0.5, y is from about 0.05 to about 0.25, and the compound has a crystal structure that consists of an expanded rutile crystal structure and a resistivity less than 100 ohm-cm comprising:

mixing titanium dioxide with an oxide of niobium;

heating the mixture for a time and at a temperature that are sufficient to cause reaction of the titanium dioxide with the oxide of niobium to form a doped titanium oxide and complete conversion to the expanded rutile crystal structure; and then subjecting the doped titanium oxide to a reducing atmosphere to remove oxygen atoms from the doped titanium oxide structure.

* * * * *